United States Patent [19]
Bieker

[11] 3,787,030
[45] Jan. 22, 1974

[54] LIFT SUPPORT DEVICE FOR USE WITH TRUCK WEIGHING SCALES

[75] Inventor: Ron D. Bieker, Salina, Kans.

[73] Assignee: Rickel, Inc., Kansas City, Mo.

[22] Filed: May 18, 1972

[21] Appl. No.: 254,508

[52] U.S. Cl.................................................. 254/8 R
[51] Int. Cl.............................................. B60p 1/48
[58] Field of Search...... 254/8, 9, 10, 2, 3, 124, 133, 254/134

[56] References Cited
UNITED STATES PATENTS

| | | | |
|---|---|---|---|
| 3,080,147 | 3/1963 | Greenhaw | 254/2 B |
| 3,606,246 | 9/1971 | Harrah | 254/2 B |
| 3,165,295 | 1/1965 | Nolden | 254/134 |
| 3,361,409 | 1/1968 | Stahl | 254/8 R |
| 3,335,883 | 8/1967 | Zahner | 254/3 C |

*Primary Examiner*—Othell M. Simpson
*Assistant Examiner*—Robert C. Watson
*Attorney, Agent, or Firm*—Carter H. Kokjer

[57] ABSTRACT

A wheeled device adapted to be manually directed in a sidewise direction under the front portion of the semi-trailer carries a hydraulic lift engagable with the dolly wheels or support pads of the trailer and operable to elevate the forward end of the trailer sufficiently to break the fifth wheel connection so that the trailer is supported only by its rear wheels and the lift devices. The wheels are constructed to permit the frame to descend into contact with the scale surface when the load is transferred from the tractor to the frame, and while it remains supported by the frame, so that the trailer is immobilized on the scale surface during weighing.

2 Claims, 8 Drawing Figures

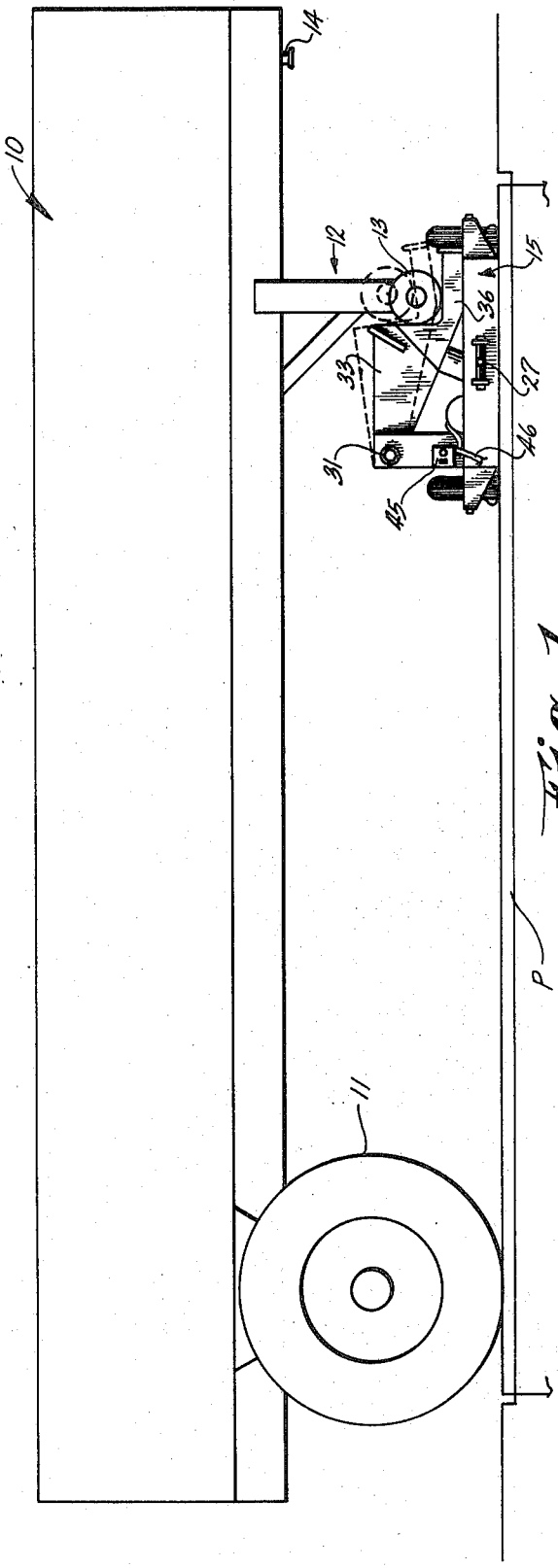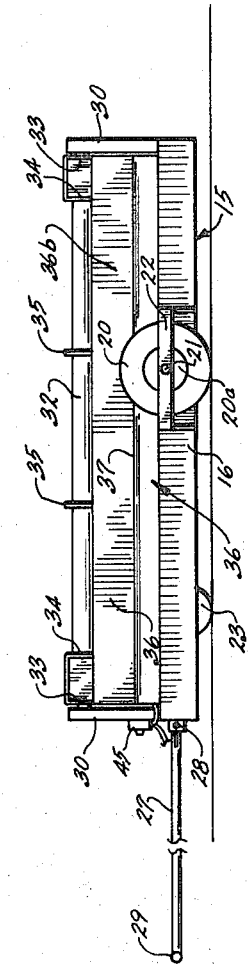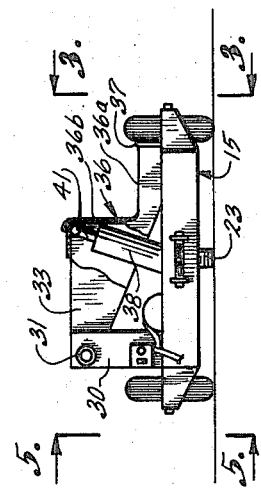

LIFT SUPPORT DEVICE FOR USE WITH TRUCK WEIGHING SCALES

BACKGROUND AND SUMMARY OF THE INVENTION

It is quite often necessary to obtain an accurate weight of the contents of semi-trailers and also to weigh the trailers themselves. In many situations this is difficult to accomplish. The principal reason is that many scale platforms are not long enough to accomodate the tractor and trailer as a unit. If the contents of a trailer are to be determined while it is still connected with the tractor, then all tractor and trailer wheels must be on the scale platform. Where the tractor and trailer combination is too long, it becomes necessary to disconnect the trailer so that it alone is supported on the scale platform and then reconnected with the tractor when weighing is completed.

While most trailers are equipped with dolly wheels (or support pads) near the forward end which can be lowered to support the trailer in the absence of the tractor, they are for the most part not easy to operate. Manually operated ones must be cranked down and up, which is a tedious procedure and not easy to do when the trailer is loaded. Also, the mechanism becomes fouled with dirt or inoperative by reason of age.

The present invention provides a device that can easily be manually placed into position on a scale platform beneath the dolly wheels or pads of the trailer and operated to upwardly engage the dolly wheels to lift the trailer sufficiently to free the fifth wheel connection. As the load is transferred to the device, it is immobilized on the scale platform and insures against accidental rolling while the trailer is on the scale. Once the trailer is reconnected, the device can be drawn free from beneath the trailer to permit removal of the equipment from the scale.

DESCRIPTION OF THE DRAWINGS

In the accompanying drawings which form a part of the specification and are to be read in conjunction therewith, and in which like reference numerals indicate like parts in the various views;

FIG. 1 is a side elevational view illustrating in a schematic way the general use of the device and showing a preferred embodiment of the device located in position on a scale beneath and supporting the front portion of representative semitrailer;

FIG. 2 is an end view of the device itself, parts being broken away for purposes of illustration;

FIG. 3 is a side elevational view taken from the side represented by line 3—3 of FIG. 2 in the direction of the arrows;

DETAILED DESCRIPTION

Figure 4:
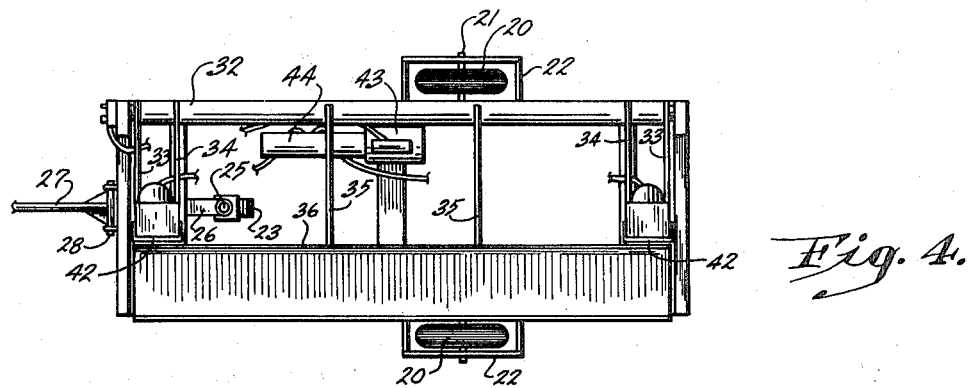
FIG. 4 is a top plan view of the device.

Referring now to the drawings and initially to FIG. 1, reference numeral 10 indicates a typical semi-trailer having the rear wheels 11 and the front dolly assembly 12. The dolly assembly includes the dolly wheels 13 which are normally retracted in an elevated position with respect to the ground plane. As is known to those in the trucking art, typical trailers of the type represented in the drawing are towed by tractors having a fifth wheel arrangement which cooperates with a fifth wheel coupling 14 in order to connect the two. The tractor itself and the fifth wheel arrangement have not been shown since neither plays any part so far as details of construction are concerned in my invention.

Figure 6:
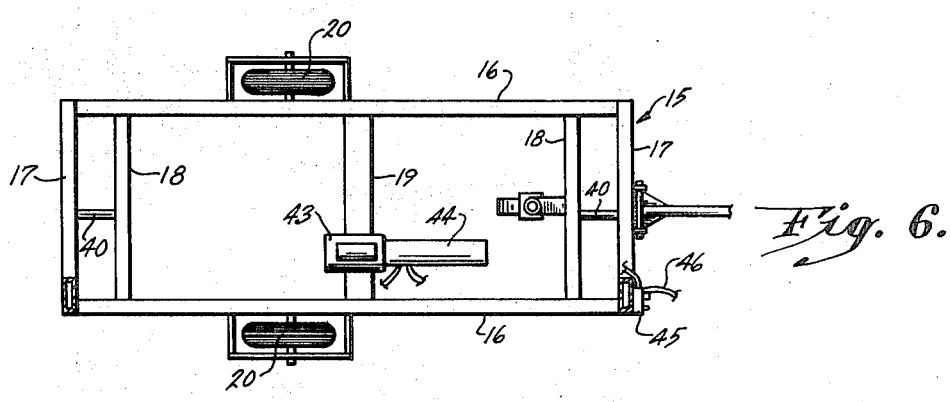
FIG. 6 is a sectional view taken generally along line 6—6 of FIG. 5 in the direction of the arrows.
Figures 7, 8:
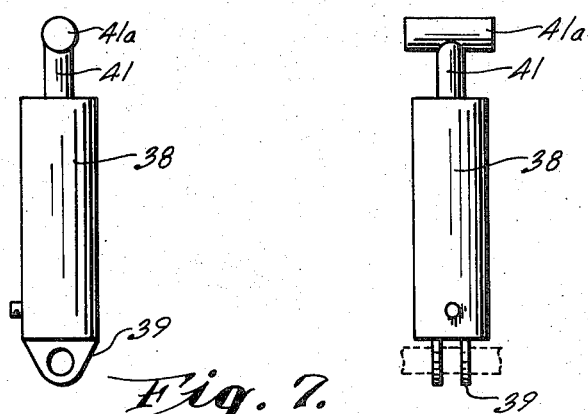
FIG. 7 is a side elevational view on an enlarged scale of one of the lift cylinders.
FIG. 8 is a view at right angles to that seen in FIG. 7 of the lift cylinder.

The main body of my lift and support device comprises a generally rectangular frame 15. The frame is constructed of conventional strong structural steel members including the side rails 16 and end members 17, all of which are joined together preferably by welding. The frame also includes cross braces 18 and a central cross member 19, all of which are best seen in FIG. 6.

The frame is supported at three points. Located on opposite sides of the frame are a pair of wheels 20 in the form of low-pressure pneumatic tires. Each wheel is supported on an axle 21 which is carried by a bracket 22 secured to the frame. It will be noted that the wheels are so disposed that the rim of the hub 20a is located above the bottom plane of the frame. The reason for this will be explained in greater detail later.

Figure 5:
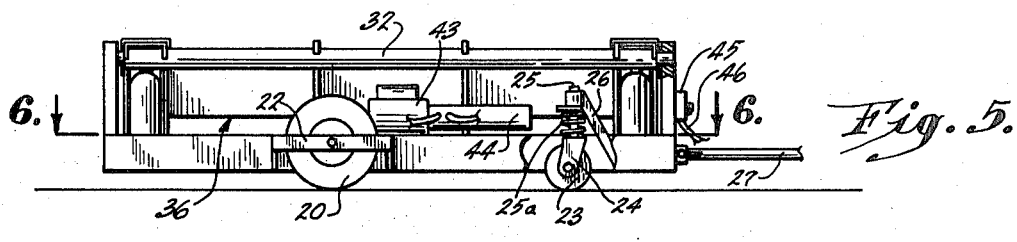
FIG. 5 is a view taken from the side represented by line 5—5 of FIG. 2 in the direction of the arrows.

The third wheel support for the frame is in the form of a swivel caster wheel 23 located toward what will be called the front portion of the device. The caster wheel 23 may be a hard or non-resilient wheel, but it is supported as shown in FIG. 5 for up and down movement relative to the frame. In the preferred embodiment the caster wheel 23 is connected with a fork 24 which has a center shaft 25. The shaft 25 extends upwardly through a suitable aperture in a support arm 26 connected with the frame. The caster wheel resiliently supports the frame by means of a coil spring 25a encircling shaft 25.

The frame is equipped with a tongue 27 pivoted to the forward end of the frame on a pin 28 for movement in a vertical plane. The outer end of the tongue has an appropriate hand hold 29.

Arising from the top of the frame at the opposite ends are a pair of upright stanchions or columns 30. These columns provide support for an axle 31 which bridges between the upper ends of the columns 30. The axle 31 may be in the form of a tube.

Sleeved on the axle 31 is another tube 32 which extends substantially the full distance between the columns 30. The tube 32 is rotatable on axle 31. Tube 32 has connected with it a plurality of radially extending structural members in the form of plates 33 and 34 near the opposite ends and plates 35 near the center portion. These are all connected at their outer ends to a cradle 36 which is generally L-shaped in cross section and providing a cradle floor 36a and a cradle back 36b. The cradle floor 36a has at its outer edge a raised lip 37.

It will be understood that the plates 33, 34, 35, the cradle 36 and the tube or sleeve 32 are all connected together by welding or other suitable means to provide what is essentially a rigid structure which is pivotal on the axle 31.

The cradle 36 is raised and lowered by means of two symmetrically located hydraulic cylinders 38 located near the opposite ends of the frame. The cylinders are disposed between the plates 33 and 34. More detail as to the construction of cylinders 38 are shown in FIGS.

7 and 8. Each cylinder is pivotally connected with the frame at its lower end by the apertured ears 39 which interfit with a horizontal pivot axle 40 extending between and rigidly secured to frame ends 17 and cross braces 18 (see FIG. 6). Mounted at the upper end of the cylinder rod 41 is a cross head 41a. The cross head 41a engages a cover piece 42 forming a corner at the outer ends of the plates 33 and 34. The cross heads 41a, when advanced by the rod, elevate the lift cradle and are retracted when the pressure is relieved in the cylinder to permit lowering of the cradle.

Any sort of controls to effect simple raising and lowering may be coupled with the cylinders. I have provided a hydraulic pump 43 operating in a conjunction with a reservoir 44 and a simple two-way system which, when the pump is coupled with the lines, extends the cylinders and when the reservoir is connected with the lines, permits the cylinders to retract. As such systems are quite conventional, I. have not shown details. The system is operated under the control of a control panel 45 which can be connected with an electrical supply through line 46.

The operation of the device is believed to be evident from the description that has preceeded. The semi-trailer 10 is shown upon the platform P of a typical platform scale. It has been driven onto the scale by the tractor (not shown). To disconnect the semi-trailer from the tractor, the device is maneuvered into position with the cradle 36 located beneath the dolly wheels 13. It will be understood that in dimensioning the device, care should be taken to insure that the cradle, when in its lowered position, is positioned at an elevation low enough that it can be moved below the dolly wheels without interference.

Once the device is in position with the cradle beneath and generally aligned with the dolly wheels, the hydraulic cylinders 38 are activated in order to extend the cylinder rods. As earlier noted, this causes the cradle 36 to be pivoted upwardly about the axle 31. As the cradle is raised the base 36a becomes inclined from the horizontal and the dolly wheel 13 will be cradled between the floor 36a and back 36b of the cradle.

The cradle is elevated sufficiently to free the coupling 14 from the fifth wheel of the trailer, after which the trailer can be moved (or it may be left stationary so long as it is not carrying any of the weight of the trailer).

The lip 37 is provided to insure of a stop at the forward edge in the event there is relative movement between the wheels and cradle when the cradle is in a position such that the floor 36a is close to the horizontal.

As the load of the trailer is picked up by the cradle the low-pressure tires 20 will be deformed in the manner shown in FIG. 1. As earlier noted, the hub 20a of the wheels at its lowest point is sufficiently above the frame to permit the frame to descend until its lower surfaces are in firm contact with the scale platform. The spring support provided by the caster wheel 23 also permits the forward portion of the device to descend until it is in firm contact with the scale. In this condition, the entire weight of the trailer 10 is being supported on the scale platform and being supported in a manner which prevents the trailer from rolling free.

The trailer is easily reconnected with the tractor by putting the tractor fifth wheel in the proper position to receive coupling 14 and then lowering the trailer by means of relieving the pressure within the cylinders 38. The device can then be drawn from beneath the trailer and the trailer driven from the scale.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A combined lift and support for use with semi-trailers of the type having a fifth wheel connection and a dolly mechanism depending below the trailer near the fifth wheel connection with trailer support members at the lower end thereof, said lift and support comprising a frame having opposite sides and ends, a plurality of wheels connected with and supporting said frame, including a side wheel adjacent each of said opposite sides, said last named wheels being parallel with one another with the axles thereof transverse to the sides of the frame, support means connected with and extending upwardly from said frame near the opposite ends thereof, a pivot arm structure connected with said support means on a horizontal pivot axis which is oriented in a direction substantially normal to said wheel axles, said pivot axis being inset in the direction toward the center of the frame from said side wheels, a truck dolly mechanism receiving cradle carried by and rigidly affixed to the outer edge of said pivot arm structure and having a cradle floor and cradle back, the cradle back being inset in the direction toward the center of the frame from said side wheels with the floor extending outwardly from the back and said back and floor defining a cradle for receiving the support members of the truck dolly mechanism, and power means carried by said frame operable to effect pivotal movement of said arm thereby to raise and lower said cradle.

2. A combined lift and support as in claim 1, said cradle comprising an elongate trough extending from one end to the other of said frame and of generally L-shape in cross section with the cradle floor providing one surface of the trough and the cradle back the other, the orientation of the floor and back being substantially parallel with said pivot axis.

* * * * *